United States Patent
Sugawara

[11] Patent Number: 6,092,840
[45] Date of Patent: Jul. 25, 2000

[54] STRUCTURE OF STEERING SUPPORT BEAM FOR VEHICLE

[75] Inventor: Mamoru Sugawara, Tokyo, Japan

[73] Assignee: Fuji Jukogyo Kabushiki Kaisha, Tokyo, Japan

[21] Appl. No.: 09/238,419

[22] Filed: Jan. 28, 1999

[30] Foreign Application Priority Data

Feb. 6, 1998 [JP] Japan .................................. 10-26109

[51] Int. Cl.$^7$ ................................................ B60K 37/00
[52] U.S. Cl. ............................................................ 280/779
[58] Field of Search ............................................. 280/779

[56] References Cited

U.S. PATENT DOCUMENTS

| | | | |
|---|---|---|---|
| 4,671,536 | 6/1987 | Yoshimura | 280/779 |
| 4,682,788 | 7/1987 | Yoshimura | 280/779 |
| 5,238,286 | 8/1993 | Tanaka et al. | 280/779 |
| 5,282,637 | 2/1994 | McCreadie | 280/779 |
| 5,868,426 | 2/1999 | Edwards et al. | 280/779 |

FOREIGN PATENT DOCUMENTS 62-127861  8/1987  Japan .

*Primary Examiner*—Kenneth R. Rice
*Attorney, Agent, or Firm*—Smith Gambrell & Russell, LLP

[57] ABSTRACT

A steering support beam structure for supporting a steering shaft of a vehicle comprises a first tubular member transversely extending across the vehicle and connected at both ends thereof with the vehicle and a second tubular member inserted into the first tubular member and connected at both ends thereof with the first tubular member. The first tubular member has a reduced diameter section at both ends thereof and the second tubular member has a enlarged diameter section at both ends thereof. The first tubular member is connected by spot-welding between the inner periphery surface of the reduced diameter section and the outer periphery surface of the enlarged diameter section with the second tubular member, thereby a double walled structure is formed in the steering support beam and a high rigidity can be obtained.

12 Claims, 11 Drawing Sheets

STRUCTURE OF STEERING SUPPORT BEAM FOR VEHICLE

BACKGROUND OF THE INVENTION

1. Field of the Invention

The present invention relates to a structure of a steering support beam for a vehicle and more particularly to a steering support beam having a double walled structure.

2. Prior Arts

In a motor vehicle, as an example of the conventional arts, a steering shaft is mounted on a steering support beam which is transversely provided on a front deck between left and right front pillars. Generally, the steering support beam is composed of a single walled pipe whose both ends are connected with the left and right front pillars, respectively and is supported at the middle portion thereof by supporting stays extended from the lower portion of the front deck. The steering shaft is mounted on the middle portion of the steering support beam through a bracket.

As another example of relating prior arts, Japanese Utility Model Application Laid-open No. Jitsu-Kai-Shou 62-127861 proposes a structure of the steering support beam, in which a pipe is connected at an end thereof with a front pillar. Further, the pipe is connected at the other end thereof with a pipe-shaped member split into two pieces such that the pipe overlaps the pipe-shaped member. Further, the member is connected at the other end thereof with a front pillar on an opposite side. The overlapped length of one piece of the member differs from that of the other piece thereof.

The steering support beam according to the former example has a problem that since it is constituted by a singe walled pipe, the steering support beam tends to cause a deformation such as a warp and the like due to the heat effect when the stays or the bracket are welded on the beam and as a result this makes it difficult to secure dimensional tolerances. Further, due to the mechanical weakness coming from the structure of the single walled pipe, it is required to increase the diameter of the pipe.

Further, the steering support beam according to the latter example has a different overlapped length between two pieces of the pipe-shaped member and this structure prevents the beam from being broken at a portion having a large change in the cross-sectional area, when an impact is applied to the beam from outside. However, since the steering support beam is also constituted by a single walled pipe, it is difficult to secure an adequate rigidity and strength.

Further, the steering support beam has a difficulty in connecting the pipe with the pipe-shaped member by welding and this is not desirable from the point of view of productivity.

SUMMARY OF THE INVENTION

In view of these situations of the prior arts, it is an object of the present invention to provide a steering support beam capable of preventing the reduction of dimensional tolerances due to the heat effect by welding. It is a further object of the present invention to provide a steering support beam having an adequate rigidity and strength without increasing the diameter of the beam.

To achieve these objects, the present invention comprises a first tubular member transversely extending across a vehicle and connected at both ends thereof with the vehicle and a second tubular member inserted into the first tubular member and connected at both ends thereof with the first tubular member so as to form a double walled structure.

DETAILED DESCRIPTION OF PREFERRED EMBODIMENTS

Figure 1:
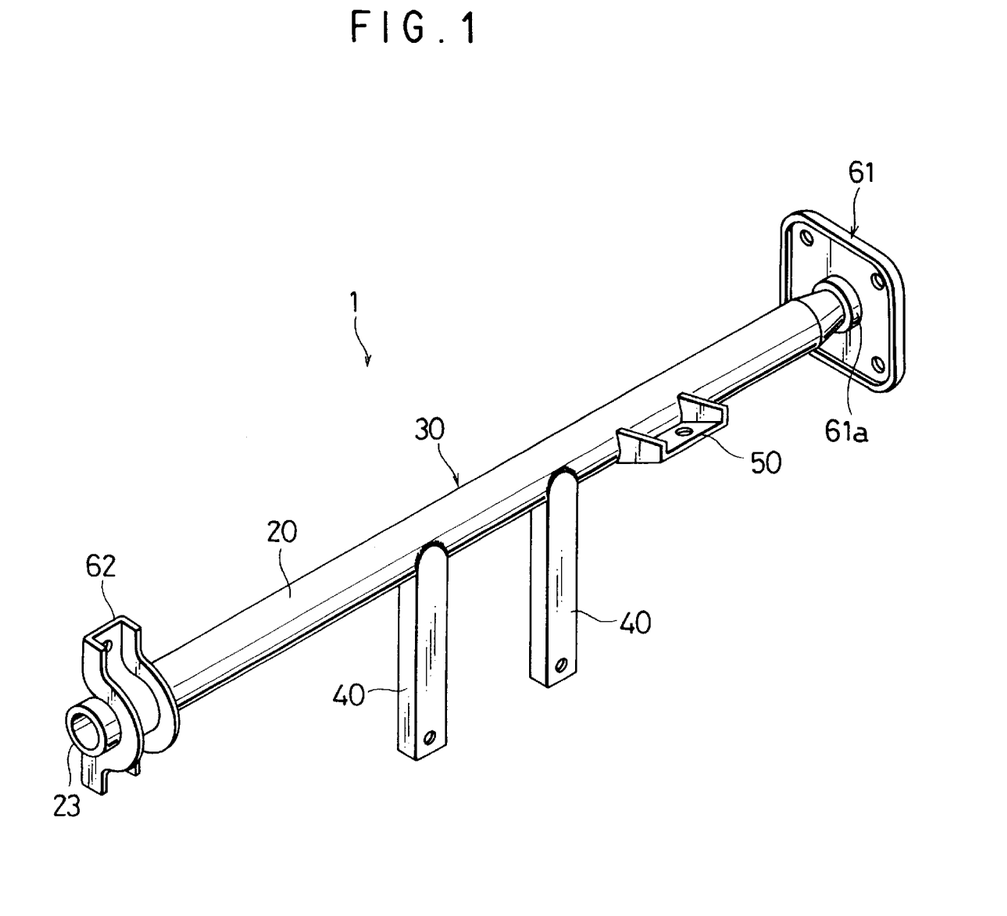
FIG. 1 is a perspective view of a steering support beam structure according to a first embodiment of the present invention.
Figure 3A:
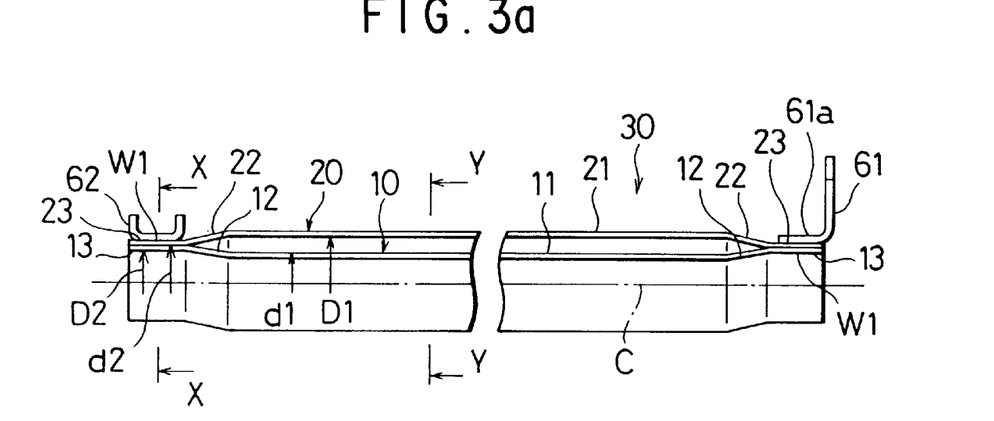
FIG. 3a is a longitudinal sectional view of a steering support beam according to a first embodiment.
Figure 3B:
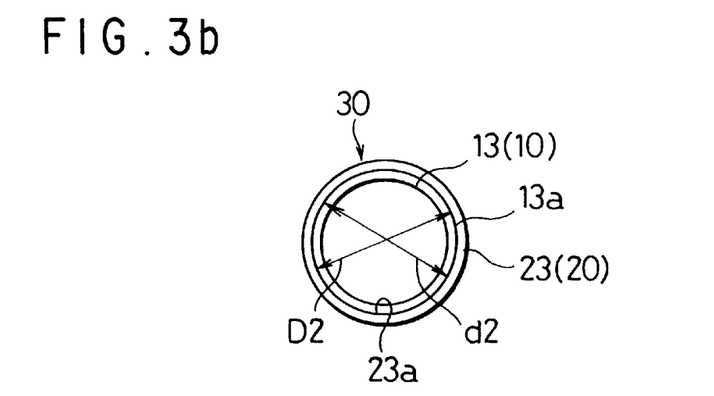
FIG. 3b is a sectional view taken along line X—X.
Figure 3C:
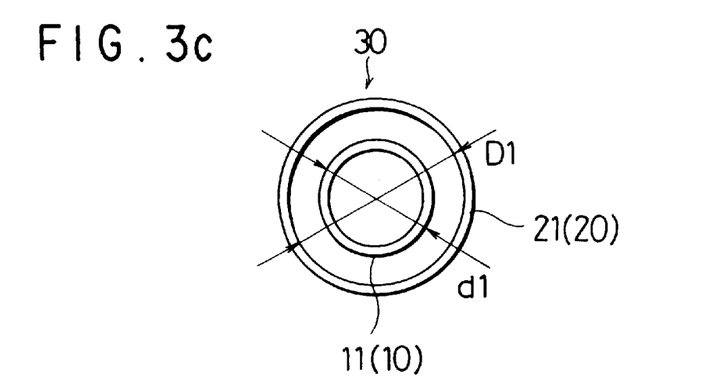
FIG. 3c is a sectional view taken along line Y—Y.

Referring now to FIG. 1, numeral 1 denotes a steering support beam unit which comprises a steering support beam 30, a stay 40, a bracket 50 and the like. The steering support beam 30 comprises an inner pipe 10 and an outer pipe 20 as shown in FIG. 3a and forms a double walled construction longitudinally along an axis C thereof. Further, the stay 40 and the bracket 50 are connected with the steering support beam by welding.

The inner pipe 10 comprises an intermediate section 11 extended straight in the middle portion thereof, a first tapered section 12 near left and right ends thereof respectively and an enlarged diameter section 13 at the left and right ends respectively.

The first tapered section 12 is formed integrally with left and right ends of the intermediate section 11 so that its diameter becomes large in the outside direction of the axis C. The enlarged diameter section 13 is shaped straight being formed integrally with the first tapered section 12.

That is, the inner pipe 10 is so formed that the outer diameter d2 of the enlarged diameter section 13 is larger than the outer diameter d1 of the intermediate section 11.

On the other hand, the outer pipe 20 comprises an intermediate section 21 extended straight in the middle portion thereof, a second tapered section 22 near left and right ends thereof respectively and a reduced diameter section 23 at the left and right ends respectively.

The second tapered section 22 is formed integrally with left and right ends of the intermediate section 21 so that its diameter becomes large in the outside direction of the axis C. The reduced diameter section 23 is shaped straight being formed integrally with the second tapered section 22.

In this way, the outer pipe 20 is so formed that the inner diameter D2 of the reduced diameter section 23 is smaller than the inner diameter D1 of the intermediate section 21.

Further, the respective lengths of the intermediate section 11, the first tapered section 12 and the enlarged diameter section 13 of the inner pipe 10 are established so as to agree with those of the intermediate section 21, the second tapered section 22 and the reduced diameter section 23 of the outer pipe 20.

Further, the inner pipe 10 is connected between the enlarged diameter section 13 and the reduced diameter section 23, for example at W1, with the outer pipe 20 by spot-welding and the like.

The outer diameter d2 of the enlarged diameter section 13 of the inner pipe 10 and the inner diameter D2 of the reduced diameter section 23 of the outer pipe 20 are established so as to be D2>d2. It should be noted that as the difference between D2 and d2 is close to zero, that is, the clearance between an outer periphery surface 13a of the enlarged diameter section 13 and an inner periphery surface 23a of the reduced diameter section 23 decreases, the weldability becomes better. On the other hand, the workability becomes worse because of the increasing friction caused between the outer periphery surface 13a and the inner periphery surface 23a, when the inner pipe 10 is inserted into the outer pipe 20 from an insertion port 23A.

Contrarily, as the difference between D2 and d2 becomes large, that is, the clearance between the outer periphery surface 13a of the enlarged diameter section 13 and the inner periphery surface 23a of the reduced diameter section 23 increases, the weldability becomes worse but the workability becomes better. Therefore, the difference between D2 and d2 should be established experimentally so as to satisfy both weldability and workability appropriately.

Figure 4:
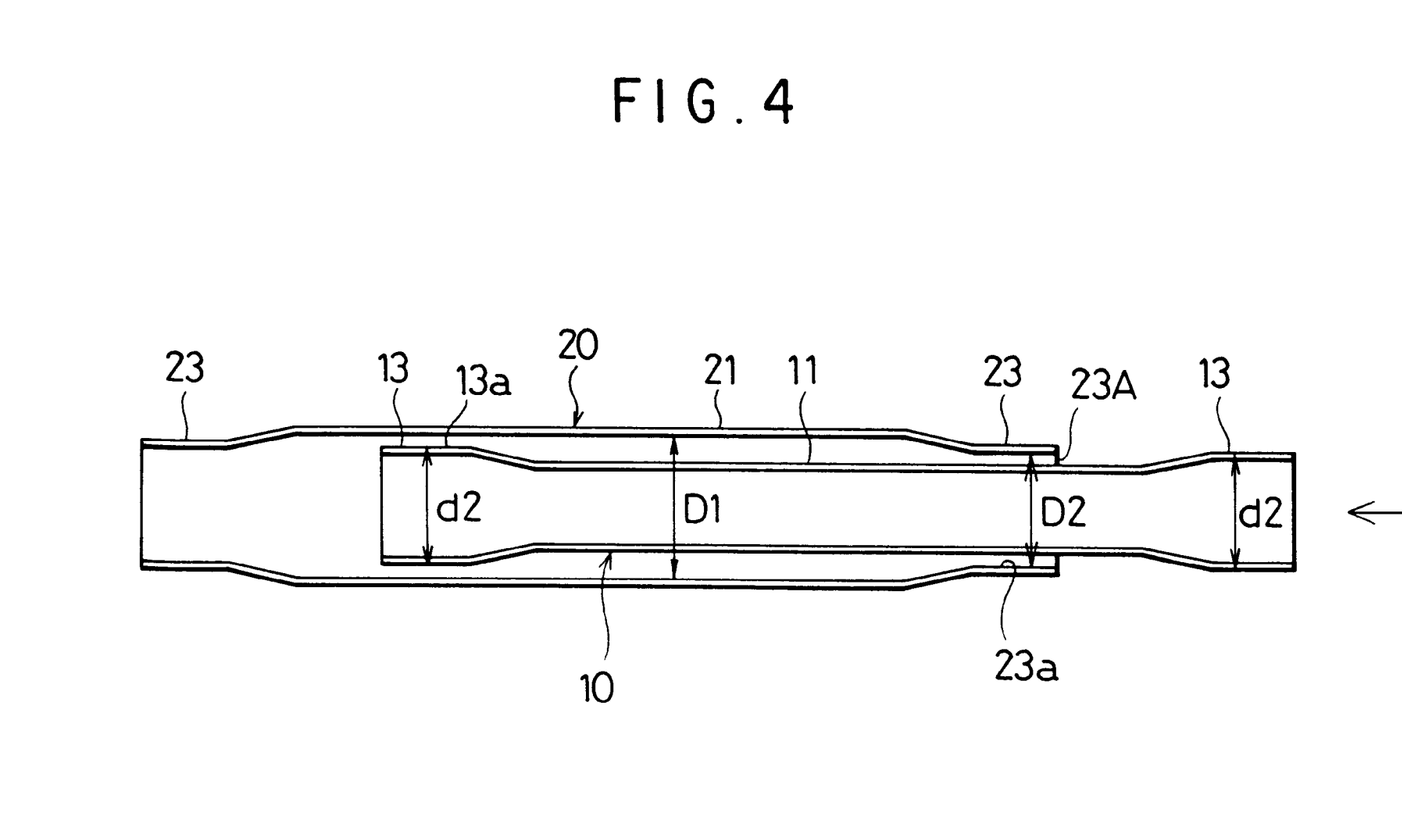
FIG. 4 is an explanatory view showing a state where an inner pipe is being inserted into an outer pipe in the direction of an arrow.

As shown in FIG. 4, when the inner pipe 10 is inserted into the outer pipe 20 from the insertion port 23A, the enlarged diameter section 13 of the inner pipe 10 travels inside of the outer pipe 20 almost over the entire length thereof. Further, the length of the intermediate section 21 is far larger than that of the left and right reduced diameter section 23.

Further, since the outer diameter d2 of the reduced diameter section 23 is established so as to be D1>D2>d2, once the enlarged diameter section 13 passes through the insertion port 23A, hereinafter the inner pipe 10 can be easily inserted into the outer pipe 20. That is, both weldability and workability can be improved by providing the enlarged diameter section 13 and the reduced diameter section 23.

The steering support beam structure 1 is completed by welding two stays 40, 40 and the bracket 50 for mounting a steering shaft (not shown) to the middle portion thereof.

Figure 2:
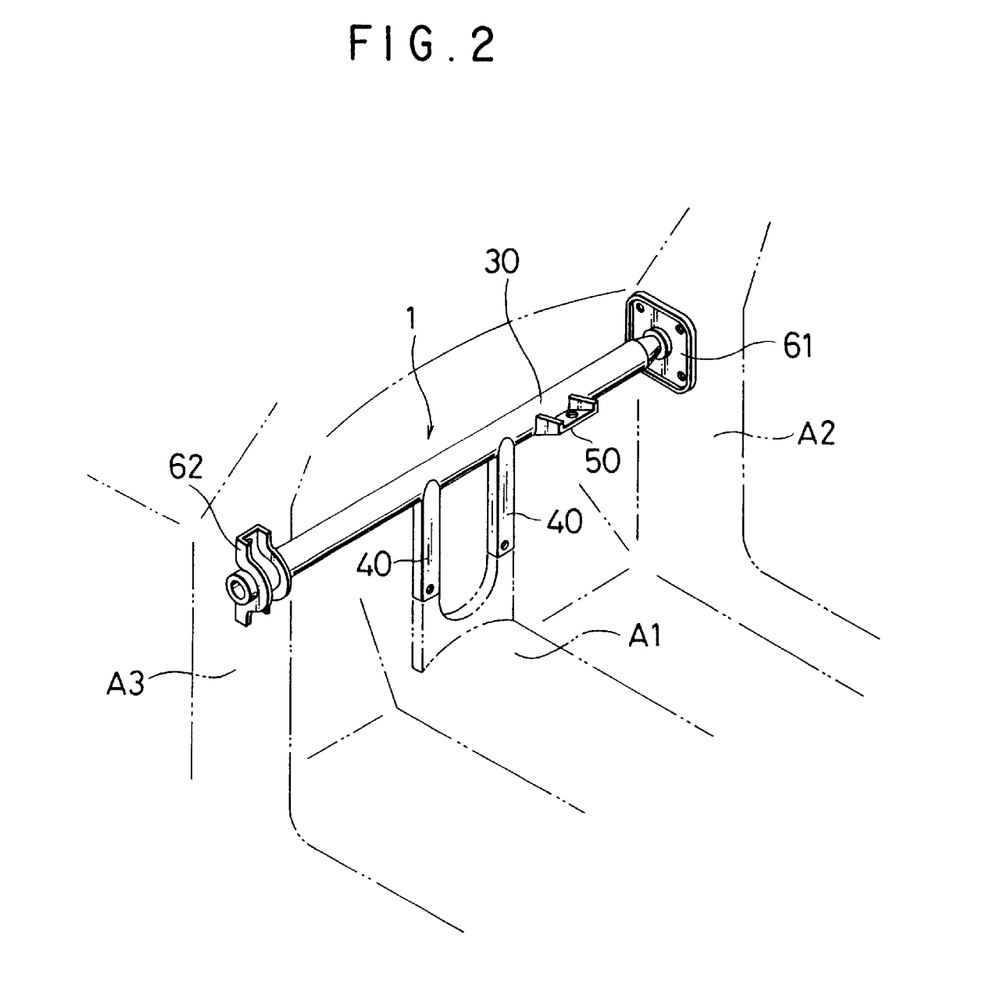
FIG. 2 is a perspective view showing a steering support beam structure mounted on a vehicle according to a first embodiment.

Further, as shown in FIG. 2, thus completed steering support beam structure 1 is at the lower portion of the stay 40 connected with a floor A1 by welding. Further, the steering support beam 30 is connected at one end thereof with one front pillar A2 through a boss 61a of a mounting plate 61 and is connected at the other end thereof with the other front pillar A3 through a bracket 62.

Figure 5:
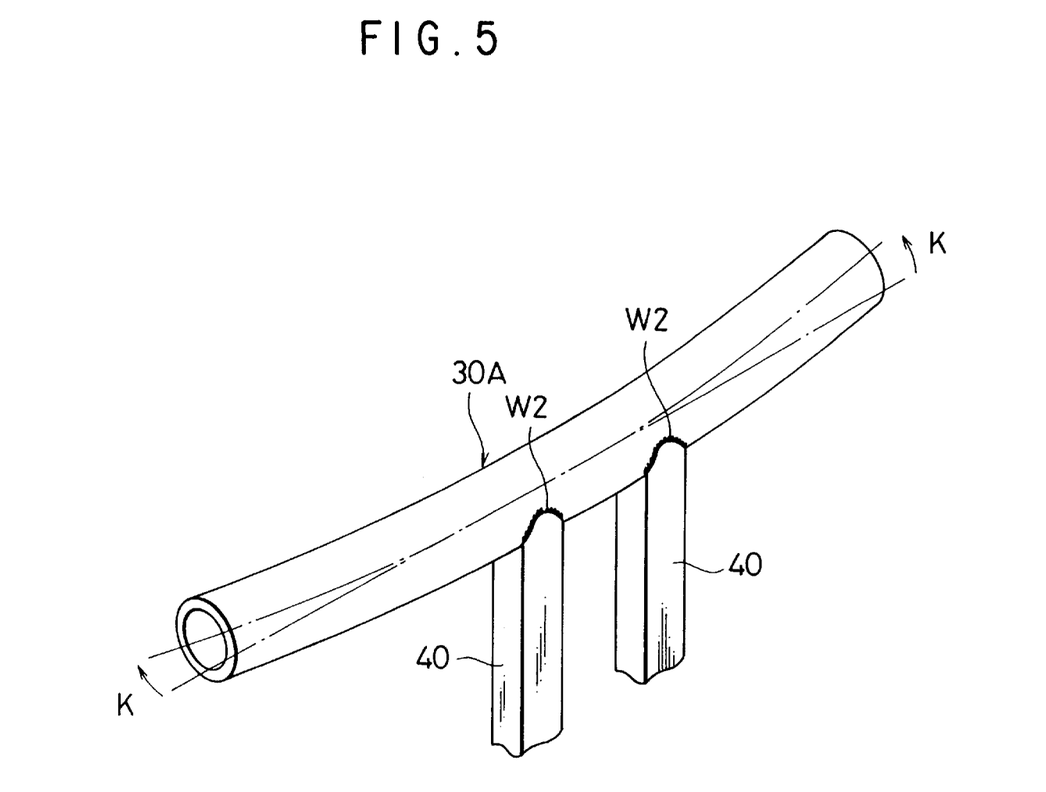
FIG. 5 is an explanatory perspective view showing a state of a deformed steering support beam according to the prior art.

In case where the stay 40 is welded at W2 to a conventional steering support beam 30A having a single walled structure, as shown in FIG. 5, the steering support beam 30A is largely warped in the direction K due to the heat effect by welding. On the other hand, since the steering support beam 30 according to the present invention has a double walled structure, the amount of warp can be minimized and therefore the reduction of the dimensional tolerances by welding can be avoided. Further, the diameter of the steering support beam 30 can be established at a reasonable size with an adequate strength retained.

Figure 6:
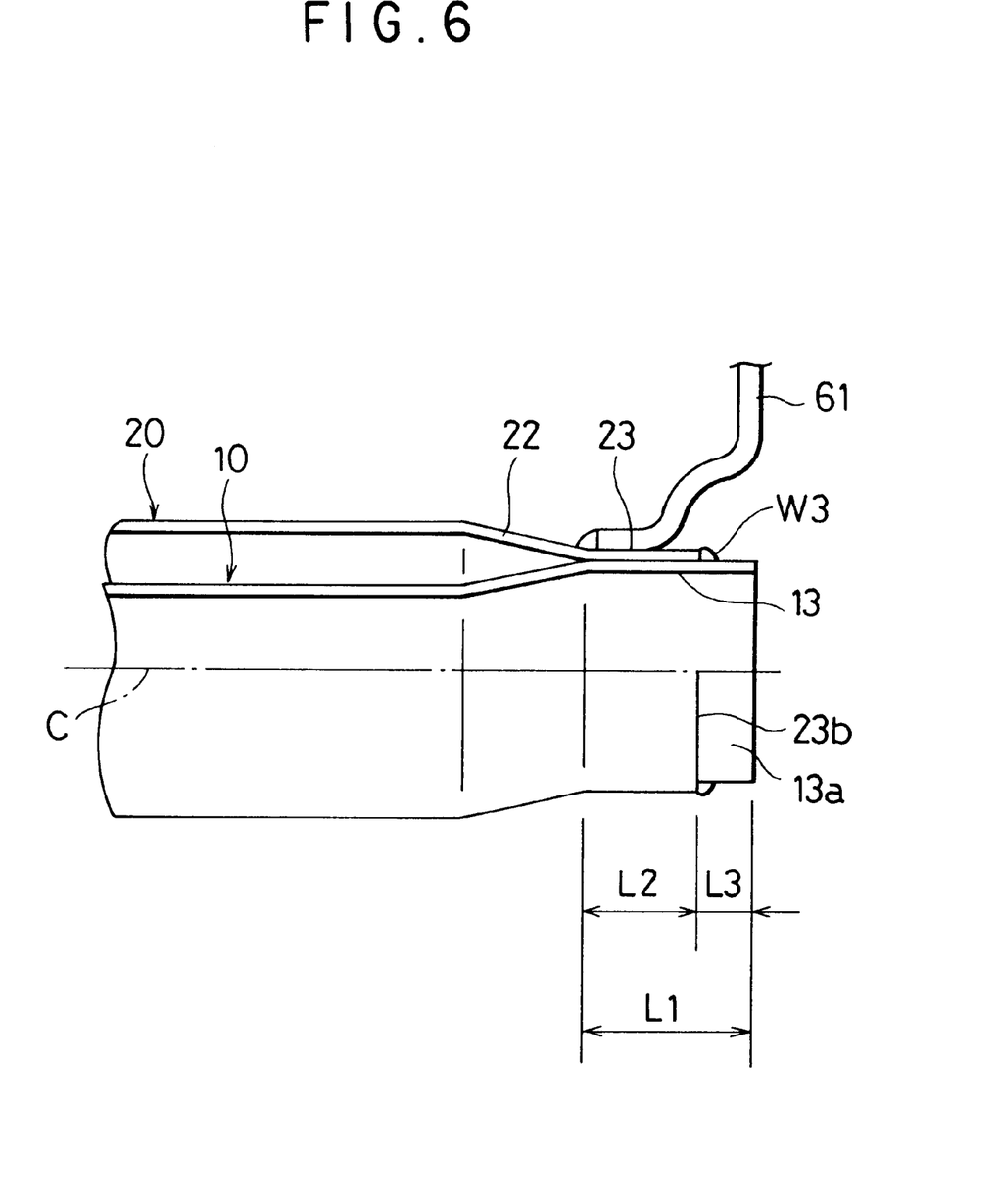
FIG. 6 is a partial sectional view of a steering support beam according to a second embodiment.

FIG. 6 is a partial sectional view of a steering support beam according to a second embodiment of the present invention. In the drawing, the length L1 along the axis C of the enlarged diameter section 13 of the inner pipe 10 is established to be larger than the length L2 along the axis C of the reduced diameter section 23 of the outer diameter 20 by L3. As a result, the enlarged diameter section 13 projects from the edge 23b of the reduced diameter section 23 and a welding section W3 is formed on the projected portion of the enlarged diameter section 23. In this case, the welding section W3 is a fillet welding.

In this embodiment, the length L2 in the direction C of the reduced diameter section of the outer pipe 20 can be established to be zero and in this case the edge of the second tapered section 22 forms a substantial reduced diameter section.

Figure 7A:
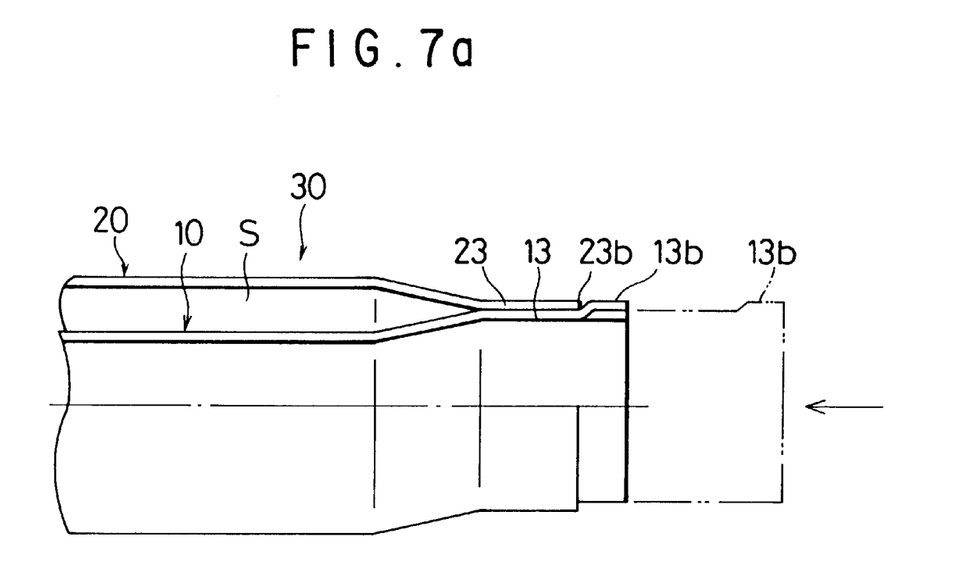
FIG. 7a is a partial sectional view of a steering support beam according to a third embodiment.
Figure 7B:
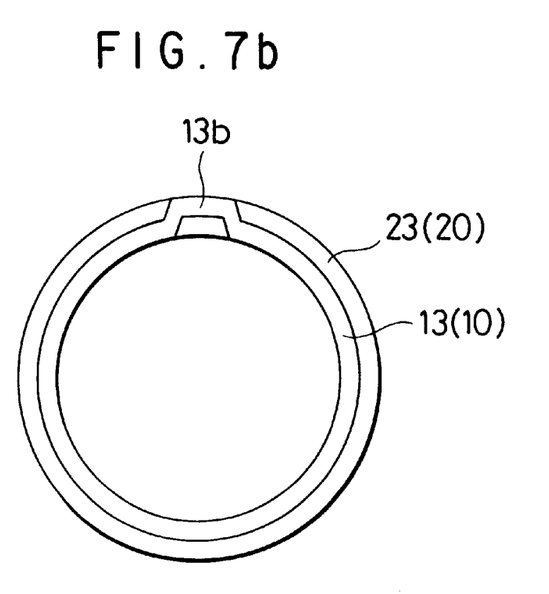
FIG. 7b is a side view of the beam shown in FIG. 7a as viewed from a signed arrow.

Describing a third embodiment of the present invention with reference to FIGS. 7a and 7b, the third embodiment is characterized in that a projection 13b is provided at one edge of the enlarged diameter section 13 of the inner pipe 10 on an insertion port side of the outer pipe 20 so as to engage with the edge 23b of the reduced diameter section 23 of the outer pipe 20.

That is, the projection 13b is used for the purpose of a positioning when the inner pipe 10 is inserted into the outer pipe 20. As a result, the positional relationship between the inner pipe 10 and the outer pipe 20 is steadily established and a steering support beam 30 having a uniform quality can be obtained.

Figure 8:
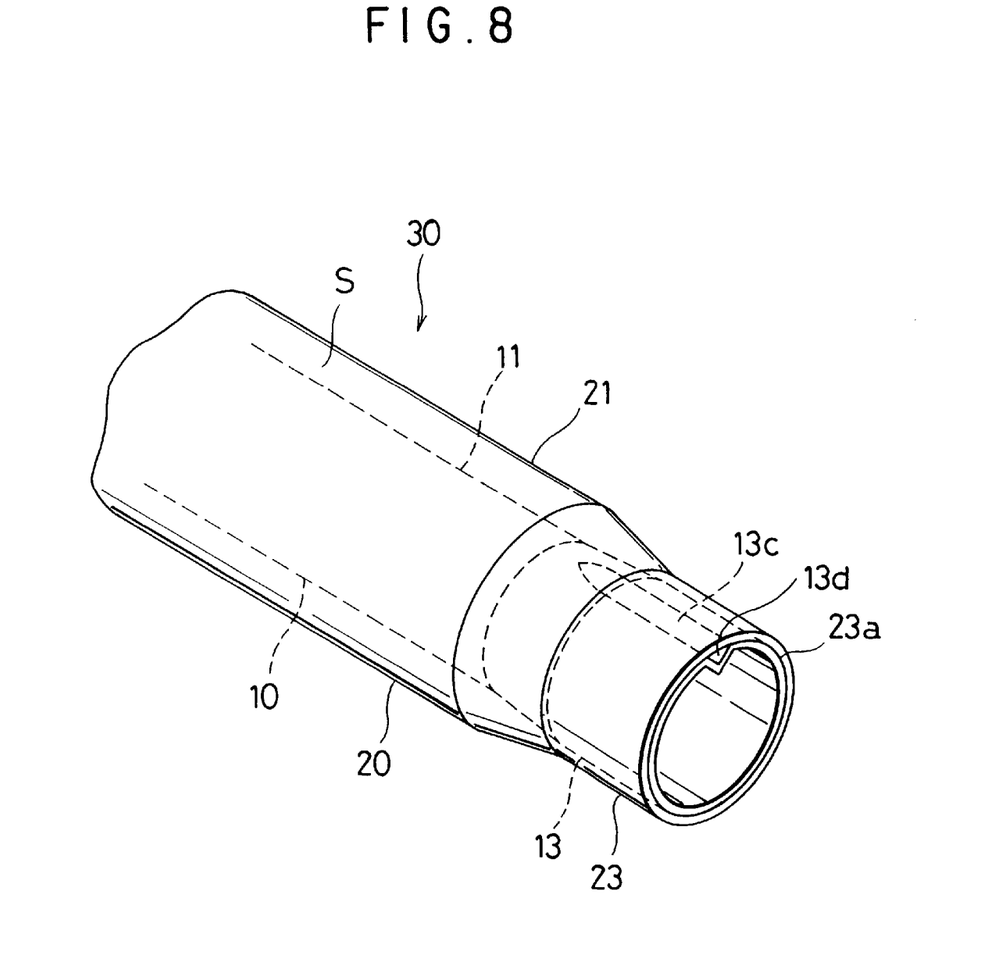
FIG. 8 is a perspective view of a steering support beam according to a fourth embodiment.

Next, describing a fourth embodiment of the present invention with reference to FIG. 8, the fourth embodiment is characterized in a notch 13c formed longitudinally on the outer periphery surface of the left and right enlarged diameter sections 13, 13 of the inner pipe 10. Further, the notch 13c forms a passage 13d between the outer periphery surface of the enlarged diameter section 13 and the inner periphery surface of the reduced diameter section 23. The passage 13d communicates outside space with a space S formed between the intermediate section 11 of the inner pipe 10 and the intermediate section 21 of the outer pipe 20 so as to ventilate the space S when the stay 40 or the bracket 50 is welded to the steering support beam 30. Also, this passage 13d acts as making it easy for rust prevention paint to come into the space S when electrodeposition coating is applied.

Figure 9:
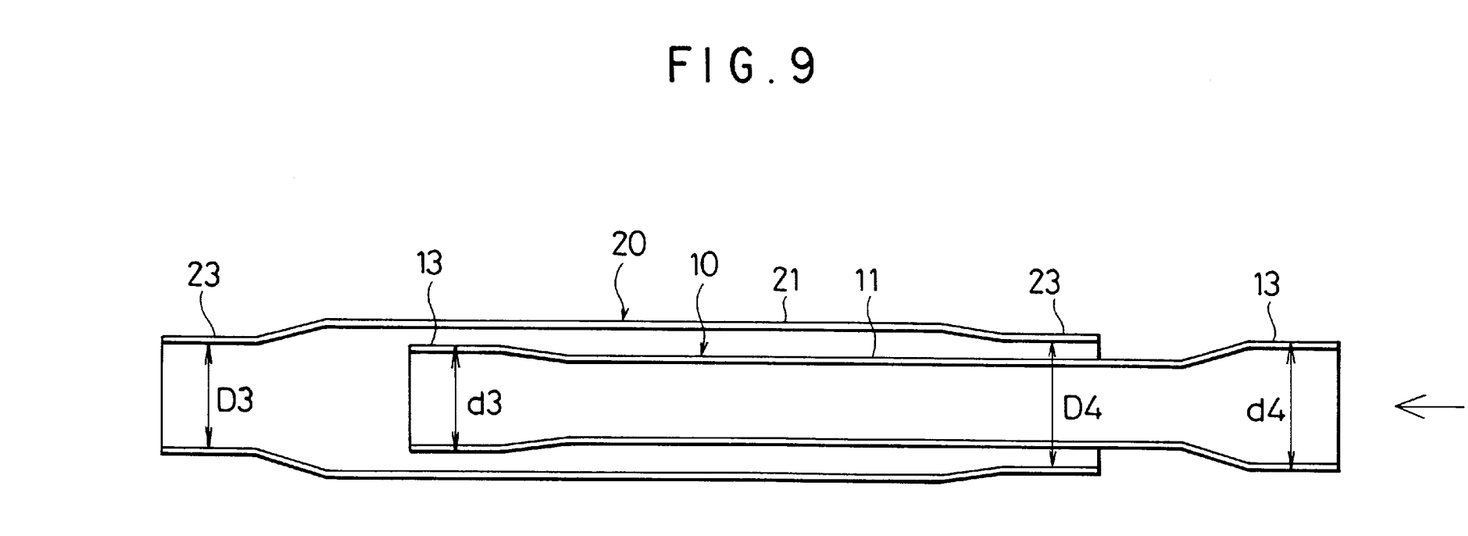
FIG. 9 is an explanatory view of a steering support beam according to a fifth embodiment when an inner pipe is being inserted into an outer pipe in the direction of a signed arrow.

A fifth embodiment will be described with reference to FIG. 9.

In the first embodiment, the inner diameter D2 of the left reduced diameter section 23 of the outer pipe 20 is established so as to agree with that of the right reduced diameter section 23. In the fifth embodiment, the inner diameter D4 of the reduced diameter section 23 on the insertion side of the inner pipe 10 is established so as to be larger than the inner diameter D3 of the reduced diameter section 23 on the other side (D4>D3). Further, the outer diameter d3 of the enlarged diameter section 13 is established according to the inner diameter D3 of the reduced diameter section 23 and the outer diameter d4 of the enlarged diameter section 13 on the other side is established according to the inner diameter D4 of the reduced diameter section 23 on the other side (d4>d3).

Thus constituted inner and outer pipes makes the assembly work easier because the inner pipe 10 can be easily inserted into the outer pipe 20.

Figure 10:
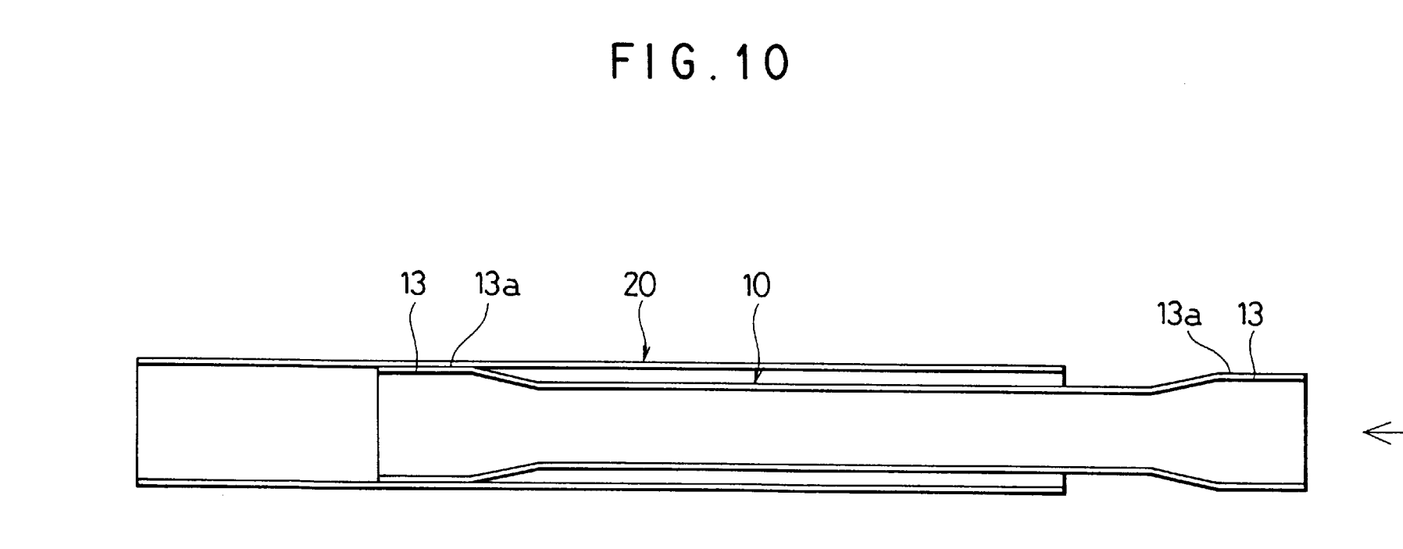
FIG. 10 is an explanatory view of a steering support beam according to a sixth embodiment when an inner pipe is being inserted into an outer pipe in the direction of an arrow.

Describing a sixth embodiment of the present invention with reference to FIG. 10, the feature of the embodiment is a combination of an outer pipe 20 shaped straight and an inner pipe 10 having enlarged diameter sections 13, 13 at the left and right ends thereof, respectively. When assembled, since the enlarged diameter section 13 of the inner pipe 10 slides inside of the outer pipe 20, the workability is slightly worsened but the manufacturing cost is lower than the outer pipe having enlarged diameter sections.

Figure 11:
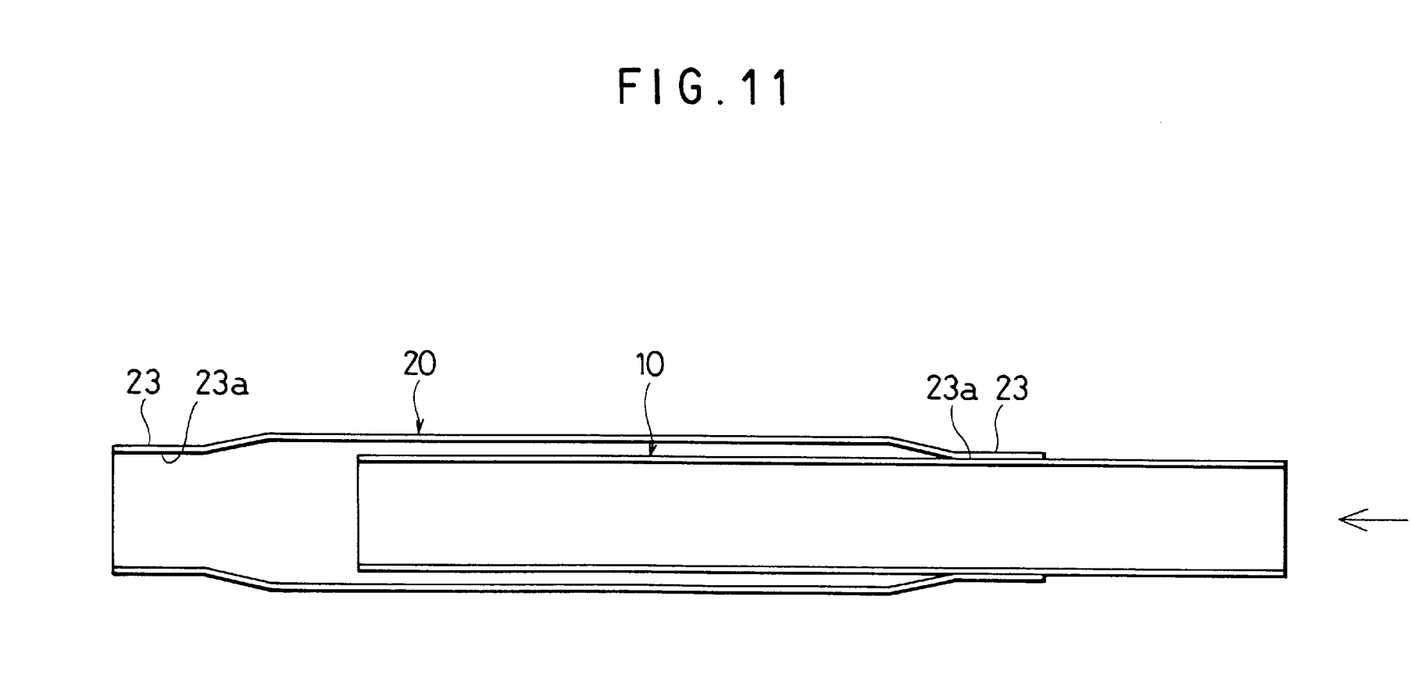
FIG. 11 is an explanatory view of a steering support beam according to a seventh embodiment when an inner pipe is being inserted into an outer pipe in the direction of a signed arrow.

FIG. 11 shows an example of a seventh embodiment, in which the inner pipe 10 is shaped straight and the outer pipe 20 has reduced diameter sections at the left and right ends thereof, respectively.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A steering support beam structure for supporting a steering shaft of a vehicle, comprising:

a first tubular member transversely extending across said vehicle and connected at both ends thereof with said vehicle; and a second tubular member inserted into said first tubular member and connected at both ends thereof with said first tubular member so as to form a double walled structure.

2. The steering support beam structure according to claim 1, wherein said first tubular member has a first intermediate section in the middle thereof and a reduced diameter section whose inner diameter is smaller than that of said first intermediate section at both ends thereof and said second tubular member has a second intermediate section in the middle thereof and an enlarged diameter section whose outer diameter is larger than that of said second intermediate section at both ends thereof.

3. The steering support beam structure according to claim 2, wherein said first tubular member is connected by spot-welding between an inner periphery surface of said reduced diameter section and an outer periphery surface of said enlarged diameter section with said second tubular member.

4. The steering support beam structure according to claim 2, wherein said first tubular member is connected by fillet-welding between an edge of said reduced diameter section and an outer periphery surface of said enlarged diameter section with said second tubular member.

5. The steering support beam structure according to claim 2, wherein said enlarged diameter section of said second tubular member has a projection at an end thereof on the insertion side of said second tubular member so as to ensure a positioning of said second tubular member with respect to said first tubular member.

6. The steering support beam structure according to claim 2, wherein at least either of said enlarged diameter section of said second tubular member and said reduced diameter section of said first tubular member has at least one notch on an outer periphery surface thereof at least on either side so as to make a passage through which a space formed between said first and second tubular members communicates with outside space.

7. The steering support beam structure according to claim 1, wherein said first tubular member has a longitudinally straight configuration and said second tubular portion has an enlarged diameter section at both ends thereof.

8. The steering support beam structure according to claim 7, wherein said first tubular member is connected by spot-welding between an inner periphery surface thereof and an outer periphery surface of said enlarged diameter section with said second tubular member.

9. The steering support beam structure according to claim 7, wherein said first tubular member is connected by fillet-welding between an edge thereof and an outer periphery surface of said enlarged diameter section with said second tubular member.

10. The steering support beam structure according to claim 1, wherein said second tubular member has a longitudinally straight configuration and said first tubular portion has a reduced diameter section at both ends thereof.

11. The steering support beam structure according to claim 10, wherein said first tubular member is connected by spot-welding between an inner periphery surface of said reduced diameter section and an outer periphery surface of said second tubular member with said second tubular member.

12. The steering support beam structure according to claim 10, wherein said first tubular member is connected by fillet-welding between an edge of said reduced diameter section and an outer periphery surface of said second tubular member with said second tubular member.

* * * * *